United States Patent  
Hua et al.

(10) Patent No.: US 8,131,066 B2
(45) Date of Patent: Mar. 6, 2012

(54) IMAGE CLASSIFICATION

(75) Inventors: Gang Hua, Kirkland, WA (US); Paul Viola, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 12/098,026

(22) Filed: Apr. 4, 2008

(65) Prior Publication Data

US 2009/0252413 A1    Oct. 8, 2009

(51) Int. Cl.
G06K 9/62    (2006.01)
(52) U.S. Cl. ........ 382/160; 382/165; 382/170; 382/203; 382/226
(58) Field of Classification Search .................. None
See application file for complete search history.

(56) References Cited

U.S. PATENT DOCUMENTS

| | | | |
|---|---|---|---|
| 6,549,660 B1 | 4/2003 | Lipson et al. | |
| 6,766,053 B2 | 7/2004 | Fan et al. | |
| 6,983,068 B2 | 1/2006 | Prabhakar et al. | |
| 6,996,268 B2 | 2/2006 | Megiddo et al. | |
| 6,996,277 B2 | 2/2006 | Fan | |
| 7,106,901 B2 | 9/2006 | de Queiroz | |
| 7,171,042 B2 | 1/2007 | Hartmann et al. | |
| 2002/0118883 A1 | 8/2002 | Bhatt | |
| 2005/0265588 A1* | 12/2005 | Gholap et al. | 382/128 |
| 2007/0196013 A1 | 8/2007 | Li et al. | |
| 2008/0089579 A1* | 4/2008 | Han et al. | 382/159 |
| 2008/0118105 A1* | 5/2008 | Friedhoff et al. | 382/103 |

OTHER PUBLICATIONS

Lienhart, et al.,"Classifying Images on the Web Automatically", Journal of Electronic Imaging 11(4), pp. 445-454, Oct. 2002.
Hammoud, "Color Texture Signatures for Art-Paintings vs. Scene-Photographs Based on Human Visual System", pp. 525-528, 17th International Conference on Pattern Recognition (ICPR'04)—vol. 2, 2004.
Wu, et al., "Detecting Differences between Photographs and Computer Generated Images", Proceeding (520) Signal Processing, Pattern Recognition, and Applications—2006.
Huang, et al., "Image Indexing Using Color Correlograms", Proceedings.,1997 IEEE Computer Society Conference on Computer Vision and Pattern Recognition, 1997. pp. 762-768.
Pietikainen, et al.,"Local Binary Pattern Approach to Computer Vision", Department of Electrical and Information Engineering, University of Oulu, 2006. 2 Pages.
Zhang, et al., "Multiple-Instance Pruning for Learning Efficient Cascade Detectors", NIPS 2007, Vancouver, Canada, Dec. 2007. pp. 1-8.

* cited by examiner

*Primary Examiner* — Brian Werner
(74) *Attorney, Agent, or Firm* — Microsoft Corporation

(57) ABSTRACT

Images are classified as photos (e.g., natural photographs) or graphics (e.g., cartoons, synthetically generated images), such that when searched (online) with a filter, an image database returns images corresponding to the filter criteria (e.g., either photos or graphics will be returned). A set of image statistics pertaining to various visual cues (e.g., color, texture, shape) are identified in classifying the images. These image statistics, combined with pre-tagged image metadata defining an image as either a graphic or a photo, may be used to train a boosting decision tree. The trained boosting decision tree may be used to classify additional images as graphics or photos based on image statistics determined for the additional images.

20 Claims, 11 Drawing Sheets

IMAGE CLASSIFICATION

BACKGROUND

In a computing environment, there is a variety of ways to classify images. For example, one may describe an image as a photo, meaning that the image is a natural photograph of one or more objects or scenes. Further, one may describe an image as a graphic, typically meaning that the image is a synthetically produced image, comic, cartoon or graphical display of one or more items. Images can be stored and retrieved from image databases, for example, by image search engines in an online environment. Often, users search image databases for images meeting criteria specified by the user, for example, by entering search terms into a webpage of an online search engine.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In computing environments, the Internet and other multimedia technologies have allowed users access to an ever increasing number of images. Internet-based image search engines (e.g., Live Search®, Google®, and Yahoo®) enable users to search for images online by entering keywords that may be associated with an image. Internet-based search engines typically store an image index in databases, which are populated by web crawlers that search the Internet for images "behind the scenes." However, keyword-based image searches have intrinsic limitations. For example, a keyword cannot account for image characteristics that may originate from content of the image, unless additional metadata is pre-attached to the image that describes the image's characteristics. For example, a user may wish to find cartoon images of a specified subject matter using an online image search engine; however, if the user enters the subject matter into the search engine a mixture of photos, cartoons, and even other graphics may be returned. Additionally, spammers can intentionally create graphic-type images of very simple visual patterns, and combine them with techniques to manipulate text keywords, to boost a ranking of these types of images in popular search queries.

Users may be more inclined to use image search engines if they return more relevant results when queried. Further, when spammers intentionally attempt to boost the ranking of their images it tends to harm performance of a search engine. Therefore, it may be desirable to have an image content filter that can classify a graphic or photo image based on the image's content characteristics.

As provided herein, a technique and system for classifying images as photos (e.g., natural photographs) or graphics (e.g., cartoons, synthetically generated images), such that when searched with a filter, an image database will return images corresponding to the filter criteria (e.g., either photos or graphics will be returned). The techniques and systems identify a set of image statistics pertaining to various visual cues (e.g., color, texture, shape). These image statistics, combined with pre-tagged image metadata defining an image as either a graphic or a photo, may be used to train a boosting decision tree. The trained boosting decision tree may be used to classify additional images as graphics or photos based on image statistics determined for the additional images.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
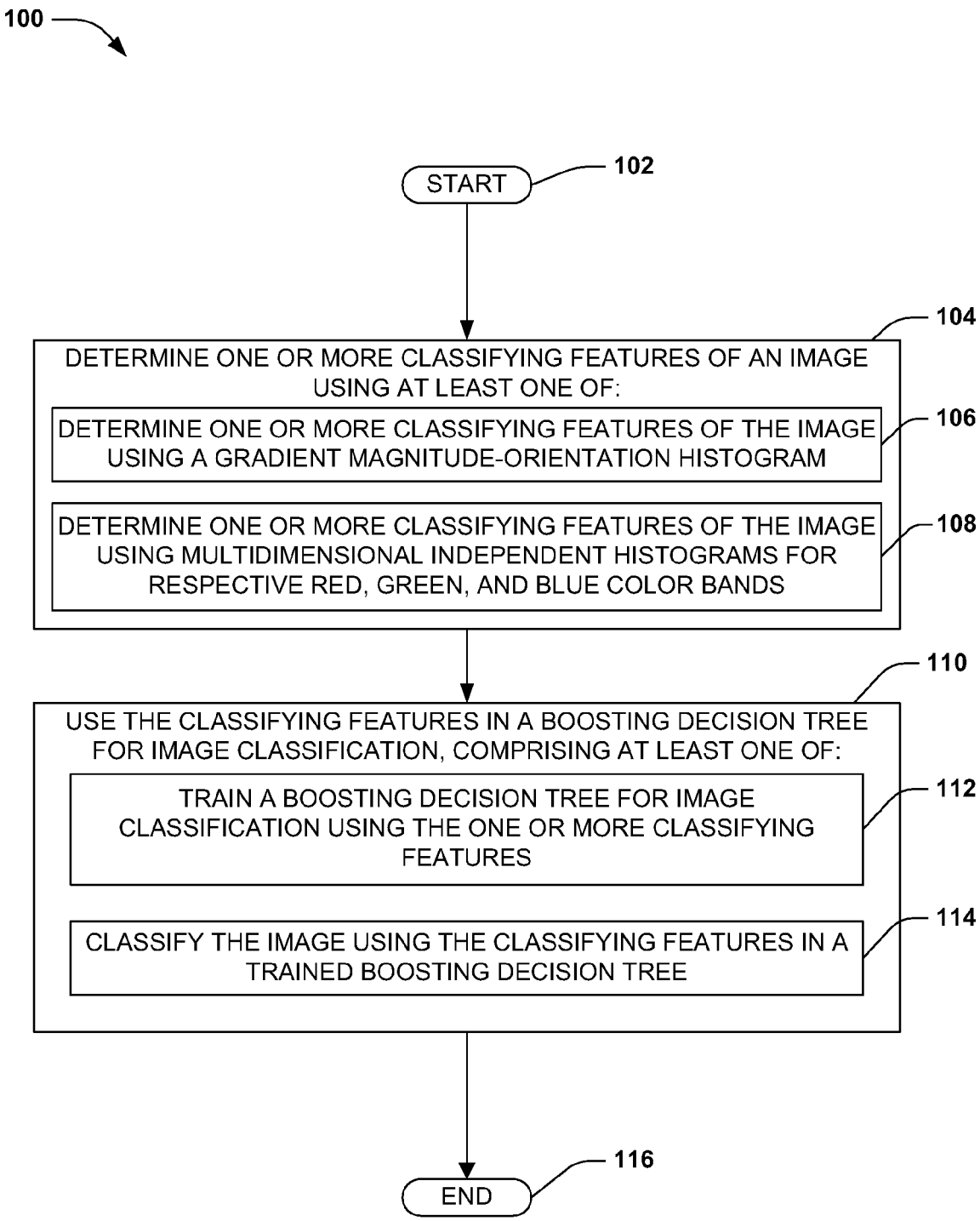
FIG. 1 is a flow diagram illustrating an exemplary method for classifying images.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In computing environments, an image's content characteristics cannot be determined by keyword searches unless metadata that described an image's characteristics is pre-attached to the image. Therefore, when a user queries an image search engine based on keywords the search engine may not be able to determine whether an image is a photo (e.g., a natural photograph of one or more objects or scenes) or a graphic (e.g., cartoons, synthetically generated images), and will likely return both graphics and photos, based on the keywords entered. However, if a user wishes to search an image database or image index it may be desirable to have a way to classify images as either photos or graphics, so that when a filter is applied to a keyword search (e.g., "filter:photos,"

"filter:graphics") the search returns images relevant to both the keywords entered and the filter applied.

Embodiments described herein relate to techniques and systems for classification of images as photos (e.g., natural photographs) or graphics (e.g., cartoons, synthetically generated images), such that, when searched with a filter, an image database will return images corresponding to the filter criteria (e.g., either photos or graphics will be returned).

A method for classifying photo and graphics images using features generated from image statistics is illustrated in FIG. 1. An exemplary method 100 begins at 102 and involves determining one or more classifying features of an image, at 104, using at least one of: determining one or more classifying features of the image using a gradient magnitude-orientation histogram (e.g., a difference between lower and higher frequency band energy from the histogram) 106; and determining one or more classifying features of the image using multidimensional independent histograms for respective red, green, and blue color bands (e.g., statistical values of discreteness, mean, variance, skewness, and kurtosis of the histograms) 108. After determining one or more classifying features of the image, the classifying features are used in a boosting decision tree 110 for at least one of: training a boosting decision tree for image classification 112; and classifying the image using the classifying features in a trained boosting decision tree 114. Having used the classifying features in a boosting decision tree the exemplary method 100 ends at 112.

In one embodiment of the method described above, various aspects of a digital image may be identified (e.g., color, texture, and shape) and further broken down into statistical data pertaining to the image's features. In one aspect, as an example, to obtain statistical features of color from and image, one can generate a joint red-green-blue (RGB) color histogram of the image, which is quantized to 1000 bins (e.g., each color band is quantized into 10 different levels of 100 bins). An entropy value can be determined from this joint color histogram and used as a statistical color feature of the image. Further, independent color histograms for each of the red, green, and blue color bands can be generated from the image. Using these histograms, statistical values can be determined (e.g., discreteness, mean, variance, skewness, and kurtosis) and used as additional statistical color features for the image.

In another aspect of this embodiment, for example, statistical features of the image's texture can be generated. In this example, local binary pattern (LBP) features of the image may be used to generate a texture histogram. For example, a 59 dimension texture histogram can be generated using 58 uniform LBP bins (e.g., those with at most two 01 transitions in an 8-bit stream) and one additional bin that accounts for remaining non-uniform LBPs. An entropy value for this LBP texture histogram can be determined and used as a statistical feature of the image.

In another aspect of this embodiment, for example, statistical features from shape information of objects in the image may be generated. To account for shape information a gradient magnitude-orientation (GMO) histogram (e.g., a 40×8=320 GMO histogram) may be generated of the image. A difference between an energy value for a low frequency color band and an energy value for a high frequency band, in the GMO histogram of the image, can be determined and used as a statistical shape information feature of the image. Also, in this example, an entropy value of the GMO histogram can be determined and used as an additional statistical shape information feature of the image. In this example, a Canny edge detector can also be used to determine statistical shape features of the image. The edge detector can be used to determine a total number of edges in the image, and an average length of edges in the image. These values can be used as additional statistical shape information feature of the image.

In another aspect of this embodiment, for example, gray-level pixels characteristics may also be used to generate statistical features of an image. A spatial correlogram of the gray-level pixels in an image (e.g., within a 1-neighborhood) can be generated for the image. Slicing the correlogram, where respective slices form a histogram, one can calculate an average skewness value of the respective slices, and use this value as a statistical feature of the image. Further, in this example, a value for an average slice variance to radius of a symmetric range ratio (e.g., where the ratio is defined as a ratio between a variance of the slice and a radius of a symmetric range over a mean of the slice that accounts for 60% of a total count of the slice, for respective slices) can be determined for respective slices of the correlogram. This ratio value may be used as an additional statistical feature of the image.

In another aspect of this embodiment, for example, the statistical features of the image can be used in a boosting decision tree in at least two ways. The statistical features of the image can be used to train the boosting decision tree to classify an image as either a graphic or a photo. Further, the features of the image can be used to classify an image as either a graphic or a photo in a boosting decision tree that has already been trained. In this example, an image can be pre-tagged with metadata indicating whether it is an image or a graphic, then the pre-tagged image can be used as a training image. The training image's statistical features can be determined using the method described above. Then the statistical features of the training image, along with the pre-tagged metadata, can be sent to train the boosting decision tree for graphic or photo image classification, based on the metadata. Additionally, the statistical features of an image can be used to classify the image as a photo or graphic. The statistical features can be sent to a boosting decision tree that is already trained to classify an image, and the trained boosting decision tree can determine whether the image is a graphic or a photo based on the statistical features.

Figure 2:
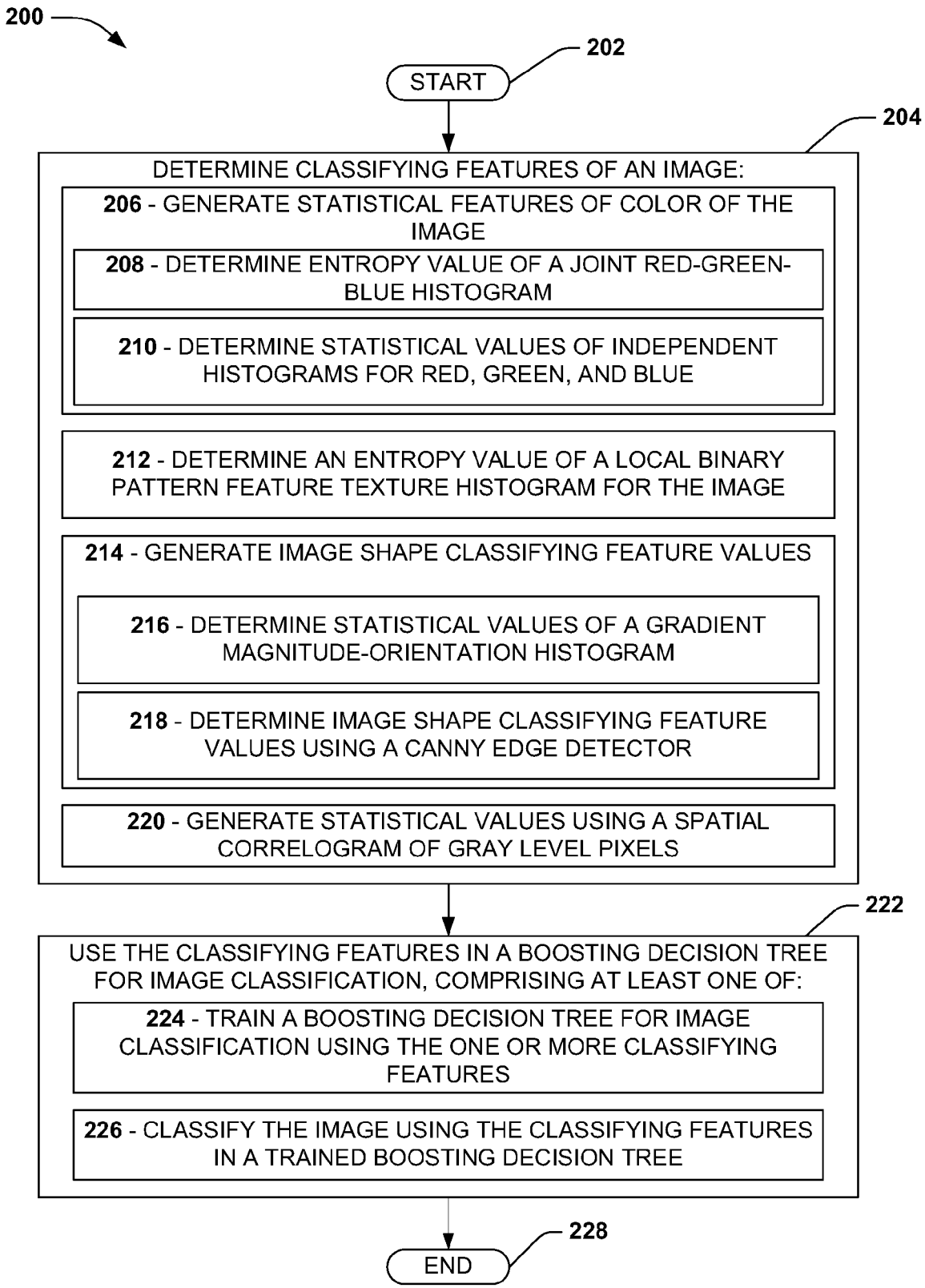
FIG. 2 is a flow diagram illustrating exemplary embodiment of a method for classifying images.

An example of this embodiment is shown in FIGS. 2-6. In FIG. 2 an exemplary method 200 begins at 202 and involves determining classifying features of an image at 204. At 206 statistical features of color of the image are generated and involve: determining an entropy value of a joint red-green-blue (RGB) histogram (e.g., a histogram quantized to 1000 bins) at 208; and determining statistical values (e.g., discreteness, mean, variance, skewness, and kurtosis) of respective independent histograms (e.g., of 100 dimensions) for red, green, and blue color bands at 210. Further, at 212, an entropy value of a local binary pattern (LBP) texture histogram (e.g., 59 dimensions) may be determined. At 214, image shape classifying feature values are generated and involve: determining statistical values (e.g., a difference between high and low frequency band energy, and entropy) of a gradient magnitude histogram (e.g., 40×8=320) at 216; and determining additional shape features of the image (e.g., number of edges, and average length of edges) using a canny edge detector at 218. At 220, statistical values (e.g., skewness and variance ratios) of a spatial correlogram of gray level pixels of the image are generated. After generating classifying features of the image, these features are used in a boosting decision tree 222 for at least one of: training a boosting decision tree for image classification 224; and classifying the image using the classifying features in a trained boosting decision tree 226. Having trained the boosting decision tree the exemplary method 200 ends at 228.

Figure 3:
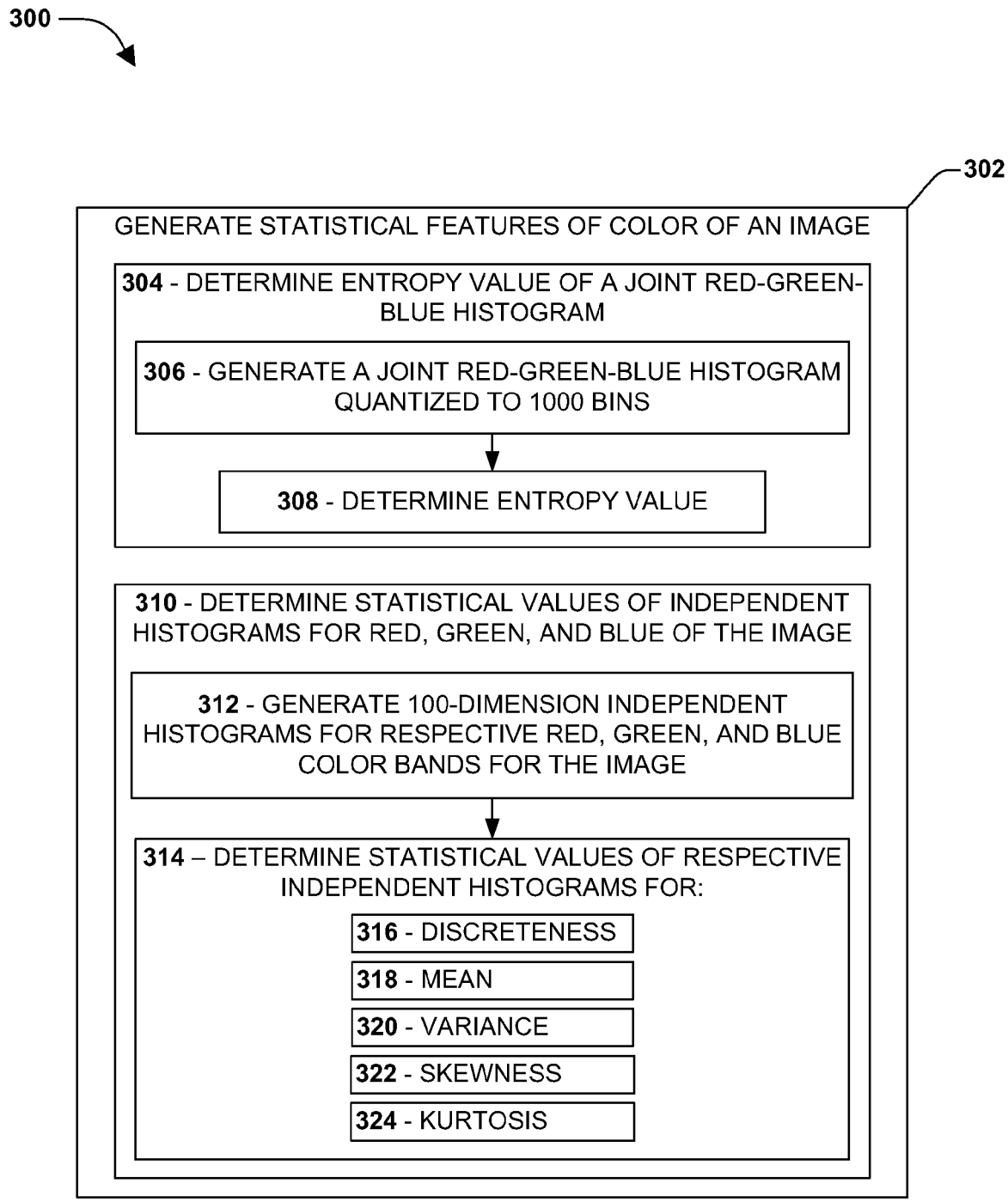
FIG. 3 is an illustration of a portion of an exemplary embodiment of a method for classifying images.

In FIG. 3 an example of a portion of an exemplary method 300 involves generating statistical features of color of an image 302. At 304, determining an entropy value of a joint RGB histogram involves: generating a joint RGB histogram quantized to 1000 bins (e.g., bins for grouping image pixels of like color, with respective color bands quantized into 10 different levels of 100 dimensions each) at 306; and determining the entropy value of the histogram at 308. At 310, determining statistical values of independent histograms for red, green, and blue color bands of the image involves: generating 100-dimension for respective red, green, and blue color bands (e.g., generating three, 100-dimension independent histograms) at 312; and determining statistical values of the respective independent histograms for discreteness, mean, variance, skewness, and kurtosis at 314.

Figure 4:
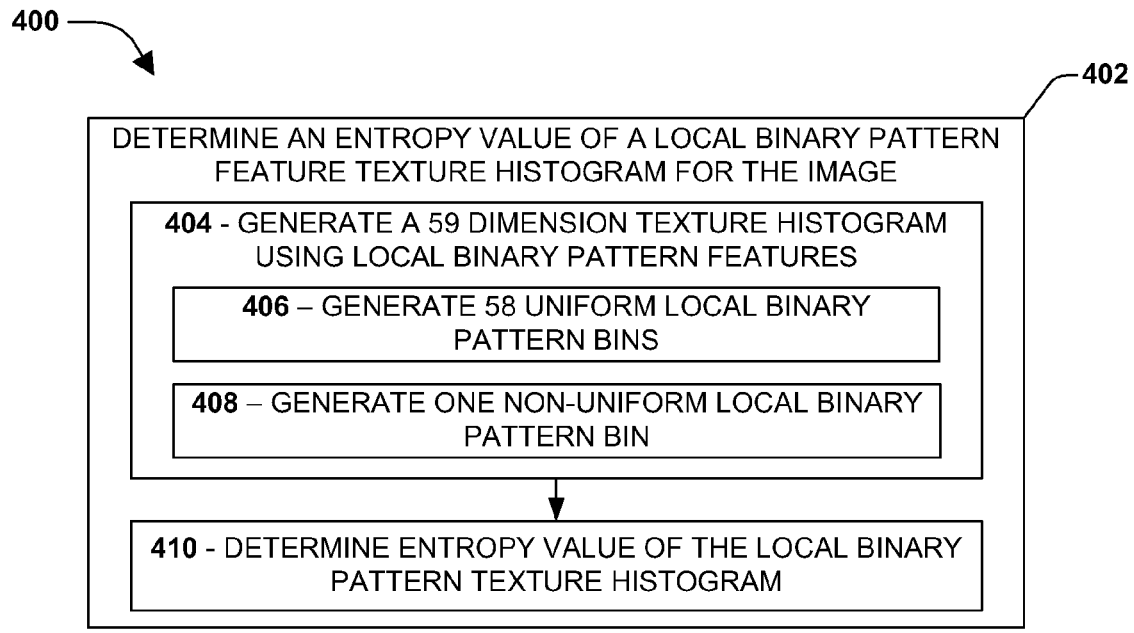
FIG. 4 is an illustration of a portion of an exemplary embodiment of a method for classifying images.

In FIG. 4 an example of another portion of an exemplary method 400 involves determining an entropy value of a local binary pattern (LBP) feature, texture histogram for an image 402. At 404, generating a 59 dimension texture histogram using LBP features involves: generating 58 bins for uniform local binary patterns (e.g., those with at most two 01 transitions on an 8-bit stream) at 406; and generating one additional bin for remaining non-uniform local binary patterns at 408. After a texture histogram is generated an entropy value for the texture histogram is determined at 410.

Figure 5:
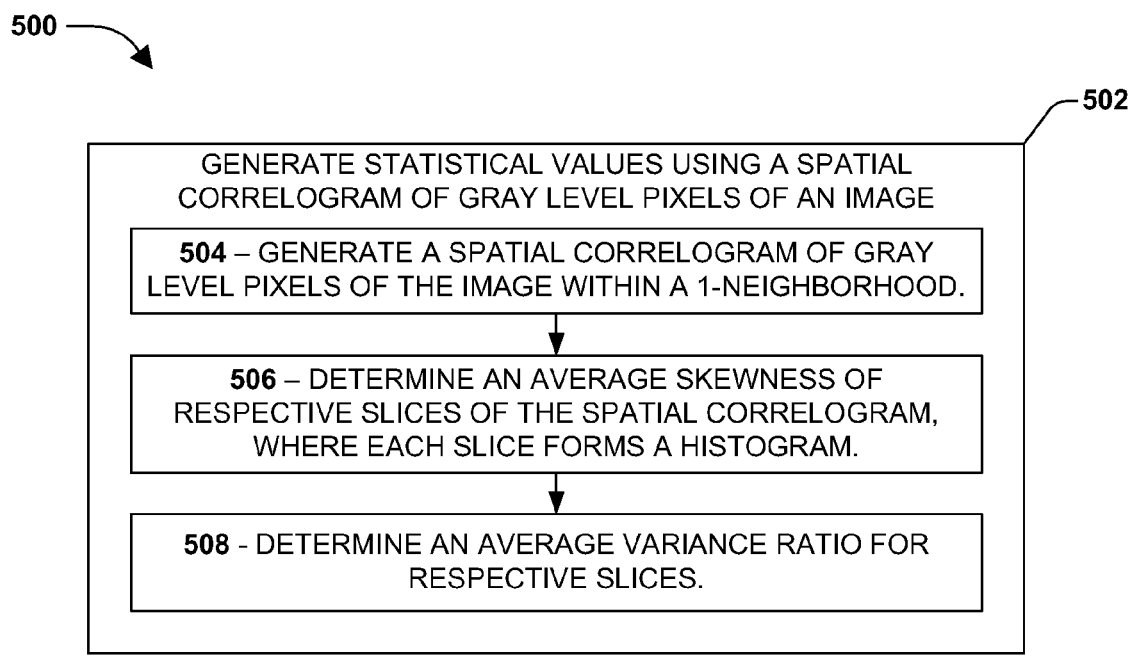
FIG. 5 is an illustration of a portion of an exemplary embodiment of a method for classifying images.

In FIG. 5 an example of another portion of an exemplary method 500 involves generating statistical values from a spatial correlogram of gray-level pixels (GLP) of an image 502. At 504, a spatial correlogram of GLP (e.g., within a 1-neighborhood) is generated. At 506, an average skewness value is determined for respective slices of the GLP spatial correlogram, where the slices form a histogram. At 508, an average variance ratio (e.g., a ratio between a variance of the respective slice and a radius of a symmetric range over a mean of the slice that accounts for 60% of a total count of the slice) of respective slices is determined.

Figure 6:
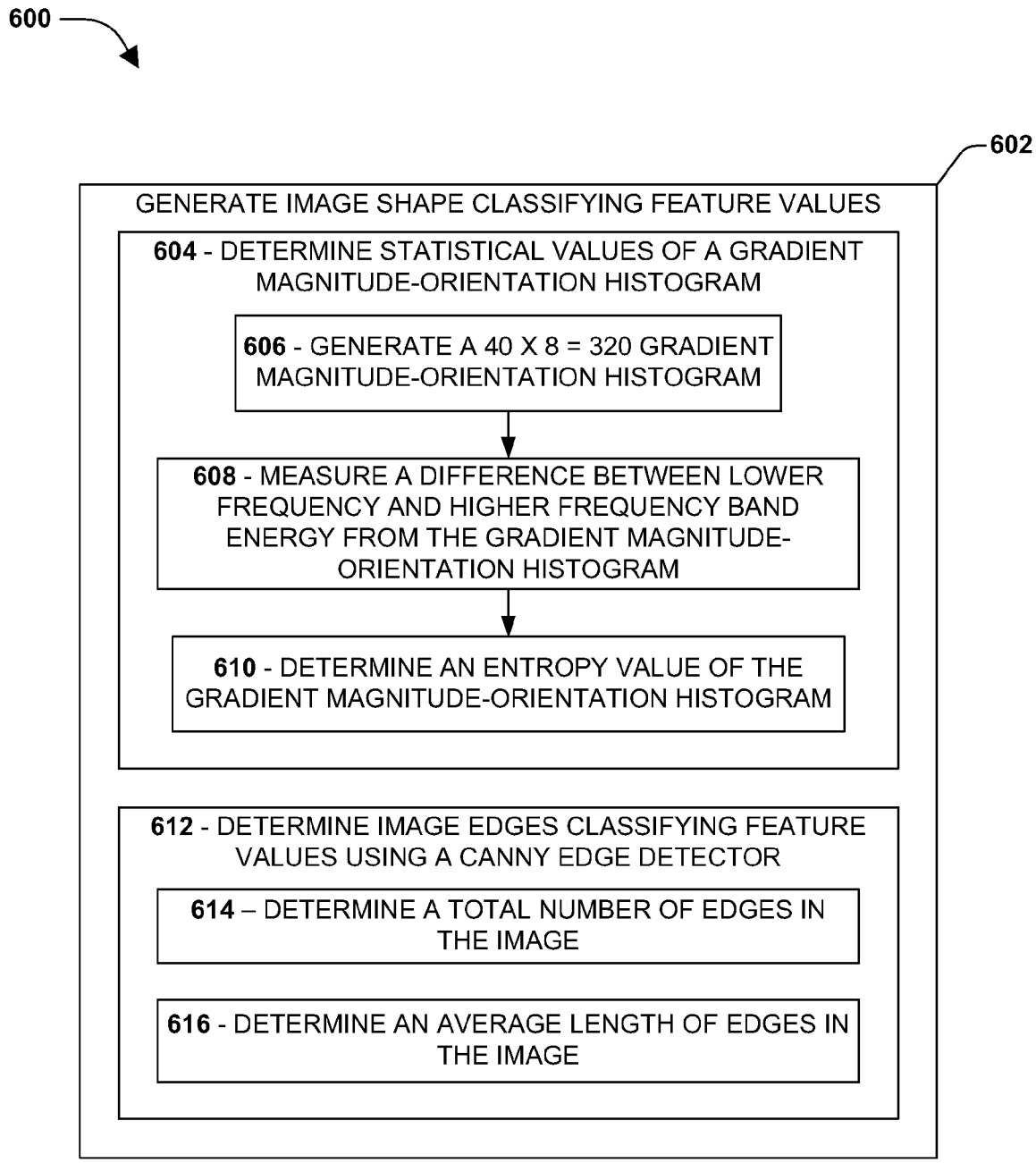
FIG. 6 is an illustration of a portion of an exemplary embodiment of a method for classifying images.

In FIG. 6 an example of another portion of an exemplary method 600 involves generating image shape classifying feature values 602. At 604 determining statistical values of a gradient magnitude-orientation histogram involves: generating a gradient magnitude-orientation (GMO) histogram (e.g., a 40×8=320 histogram) at 606; measuring a difference between energy in a lower frequency band and energy in a higher frequency band of the GMO histogram to generate an energy value at 608; and determining an entropy value of the GMO histogram at 610. At 612, a canny edge detector is used to determine edge classifying features of the image, and involves: determining a total number of edges in the image at 614; and determining an average length of edges in the image at 616.

Figure 8:
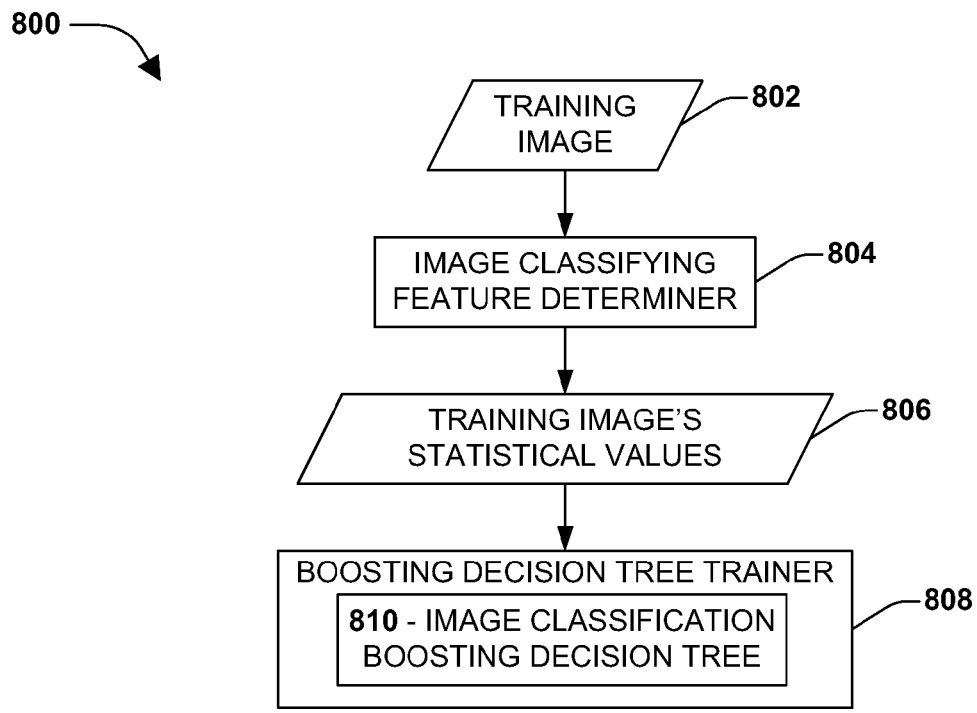
FIG. 8 is a block diagram of a portion of an exemplary system for image classification.
Figure 9:
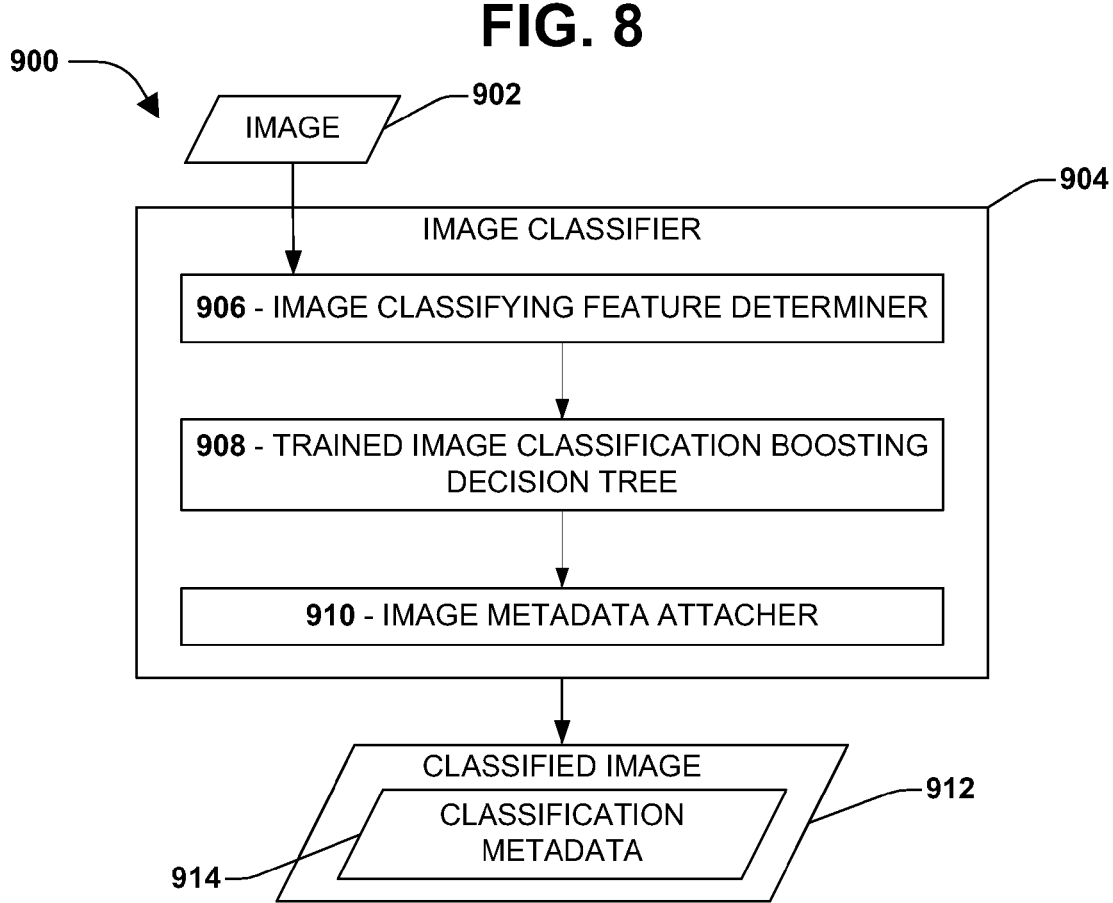
FIG. 9 is a block diagram of another portion of an exemplary system for image classification

A system may be configured for image classification, for example, such that when a user enters filter criteria (e.g., "filter:graphic" or "filter:photo") into an image search system, images are returned that meet the corresponding filter criteria. An embodiment of a system for image classification is illustrated in FIG. 8 and FIG. 9. In exemplary system 800, a training image (e.g., an image used to train an image classification system, such that the training image has known characteristics) 802 is sent to an image classifying feature determiner 804, which determines the training image's classifying features using statistical values 806 of the training image 802. The training image's statistical values 806 are sent to a boosting decision tree trainer 808, which uses the training image's statistical values 806 to train an image classification boosting decision tree 810 for image classification. In FIG. 9, an image classifying feature determiner 906 and a trained image classification boosting decision tree 908 are operably coupled to an image classifier 904. An image (e.g., retrieved by an Internet web-crawler) is sent to the image classifying feature determiner 906, in the image classifier 904, which determine the image's classifying features. The image's classifying features are sent to the trained image classification boosting decision tree 908, which determines whether the image 902 is, for example, a graphic or a photo. An image classification is sent to an image metadata attacher 910, which attaches classification metadata (e.g., "graphic" or "photo") 914 to the classified image 912 that corresponds to the image classification from the trained image classification boosting decision tree 908. The exemplary system 900 yields the classified image 912 with the attached classification metadata 914, which may be sent, for example, to an image database (not illustrated) for later retrieval by a user (not illustrated).

Figure 10:
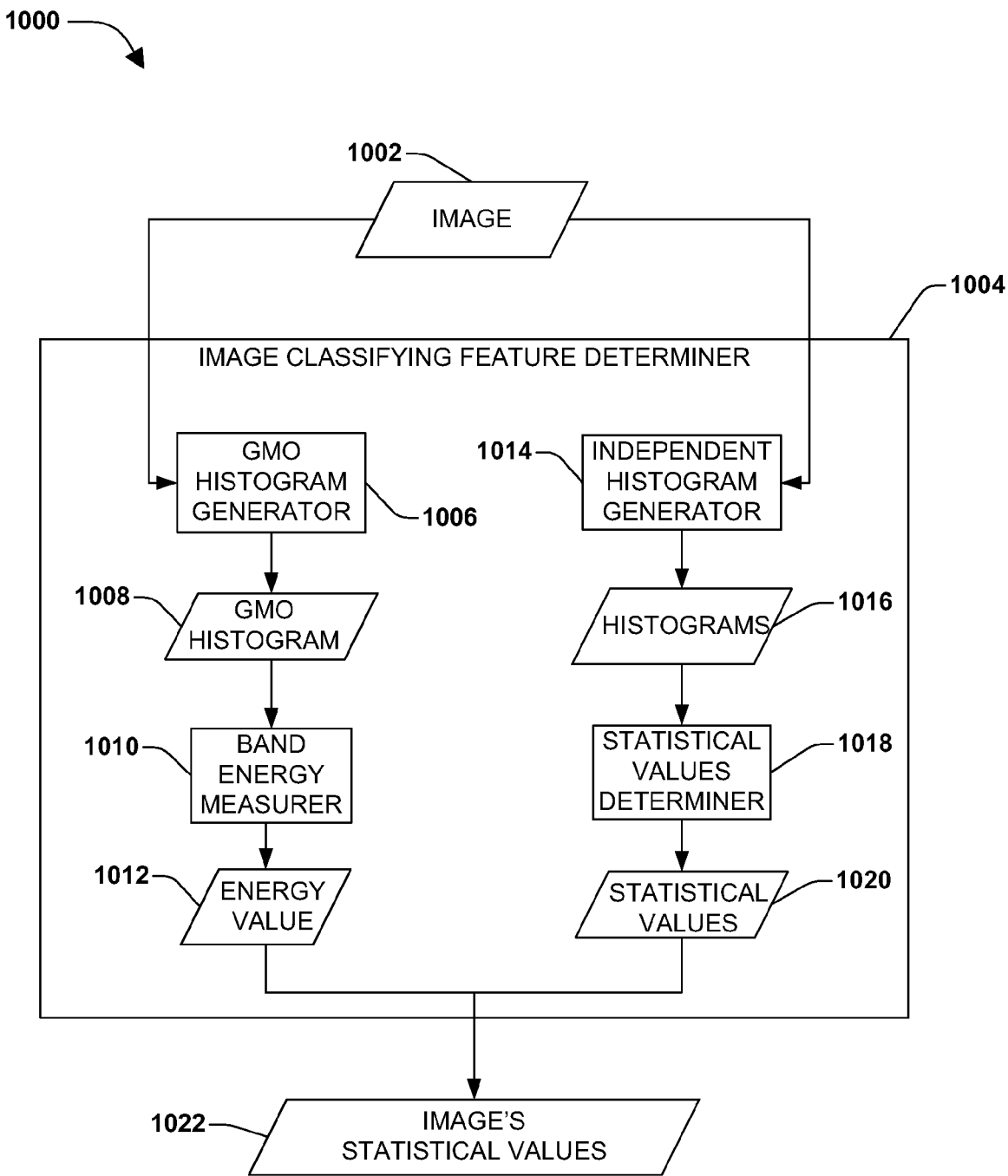
FIG. 10 is a block diagram of an exemplary system for image classification.

One embodiment of a portion of this system is illustrated in FIG. 10 by an exemplary system 1000. An image 1002 is sent to an image classifying feature determiner 1004, which runs the image through a gradient magnitude orientation (GMO) histogram generator 1006 and an independent histogram generator 1014. The GMO histogram generator 1006 generates a GMO histogram 1008 for the image 1002, and sends it to an band energy measurer 1010. The band energy measurer 1010 measures a difference between energy in a high frequency color band and energy in a low frequency color band from the GMO histogram 1008, generating an energy value 1012 for the image 1002. The independent histogram generator 1014 generates multidimensional independent histograms for respective red, green, and blue color bands of the image 1016, and sends them to a statistical values determiner 1018. The statistical values determiner 1018 determines statistical values (e.g., discreteness, skewness, variance, mean, and kurtosis) 1020 for the respective red, green, and blue independent histograms 1016. Both the entropy value 1012 and the statistical values 1020 are sent from the image classifying feature determiner 1004 as the image's statistical values 1022. As an example, the image's statistical values 1022 may be sent to a boosting decision tree trainer, such as 808 in FIG. 8, which may use the statistical values 1022 to train an image classification boosting decision tree, such as 810 in FIG. 8.

Figure 11:
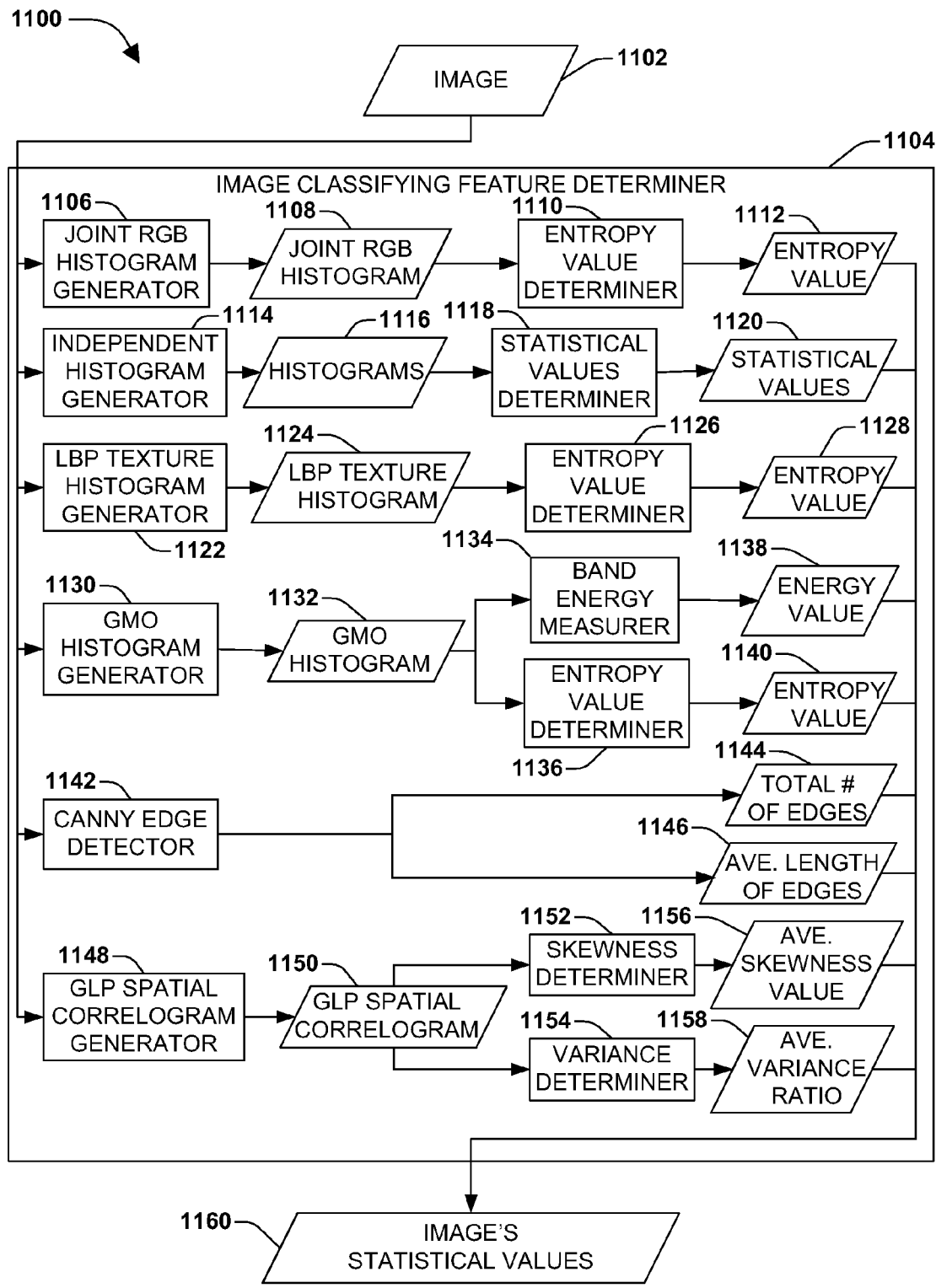
FIG. 11 is a block diagram of an exemplary embodiment of an exemplary system for image classification.

One example of this embodiment is illustrated in FIG. 11 by an exemplary system 1100. An image 1102 is sent to an image classifying feature determiner 1104, which runs the image 1102 through a series of system components, including, a joint red-green-blue (RGB) histogram generator 1106, an independent histogram generator 1114, a local binary pattern (LBP) texture histogram generator 1122, a gradient magnitude orientation (GMO) generator 1130, a canny edge detector 1142, and a gray level pixel spatial (GLP) correlogram generator 1148.

In FIG. 11, the joint RGB histogram generator 1106 generates a joint RGB histogram for the image 1102, and sends it to an entropy value determiner 1110. The entropy value determiner 1110 determines an entropy value 1112 for the histogram 1108 and sends it out of the image classifying feature determiner 1104 as a portion of the image's statistical value 1160. The independent histogram generator 1114 generates multidimensional independent histograms for respective red, green, and blue color bands of the image 1116, and sends them to a statistical values determiner 1118. The statistical values determiner 1118 determines statistical values (e.g., discreteness, skewness, variance, mean, and kurtosis) 1120 for the respective red, green, and blue independent histograms 1116, and sends them out of the image classifying feature determiner 1104 as a portion of the image's statistical values 1160. The LBP texture histogram generator 1122 generates a LBP texture histogram 1124 for the image 1102 and sends it to an entropy value determiner 1126. The entropy value determiner 1126 determines an entropy value 1128 for the LBP texture histogram 1124, and sends it out of the image classifying feature determiner 1104 as a portion of the image's statistical value 1160. The GMO generator 1130 generates a GMO histogram 1132 for the image 1102, and sends it to a band energy measurer 1134 and an entropy value determiner 1136. The band energy measurer 1134 measures a difference between a high and low frequency energy band from the GMO histogram 1132 generating an energy value 1138 for the image 1102. The entropy value determiner 1136 determines an entropy value 1140 from the GMO histogram 1132, and both the energy value 1138 and the entropy value 1140 are sent out of the image classifying feature determiner 1104 as a portion of the image's statistical values 1160. The canny edge detector 1142 detects a total number of edges 1144 in the image 1102 and an average length of edges 1146 in the image 1102, and sends both values out of the image classifying feature determiner 1104 as a portion of the image's statistical values 1160. The GLP spatial correlogram generator 1148 generates a GLP spatial correlogram 1150 for the image 1102 and sends it a skewness determiner 1152 and a variance determiner 1154. The skewness determiner 1152 determines an average skewness value 1156 for the correlogram 1150. The variance determiner 1154 determines an average variance ratio (e.g., a ratio between a variance of the respective slice and a radius of a symmetric range over a mean of the slice that accounts for 60% of a total count of the slice) 1158 for the correlogram 1150. Both values 1156 and 1158 are sent out of the image classifying feature determiner 1104 as a portion of the image's statistical values 1160. As an example, the image's statistical values 1160 may be sent to a boosting decision tree trainer, such as 808 in FIG. 8, which may use the image's statistical values 1160 to train an image classification boosting decision tree, such as 810 in FIG. 8.

Various embodiments of the system described above may be configured by those skilled in the art for classifying images as photos or graphics. These embodiments may include one of more aspects of the system operably coupled with each other, operating in conjunction, or operating separately to obtain desired image classification results.

Figure 7:
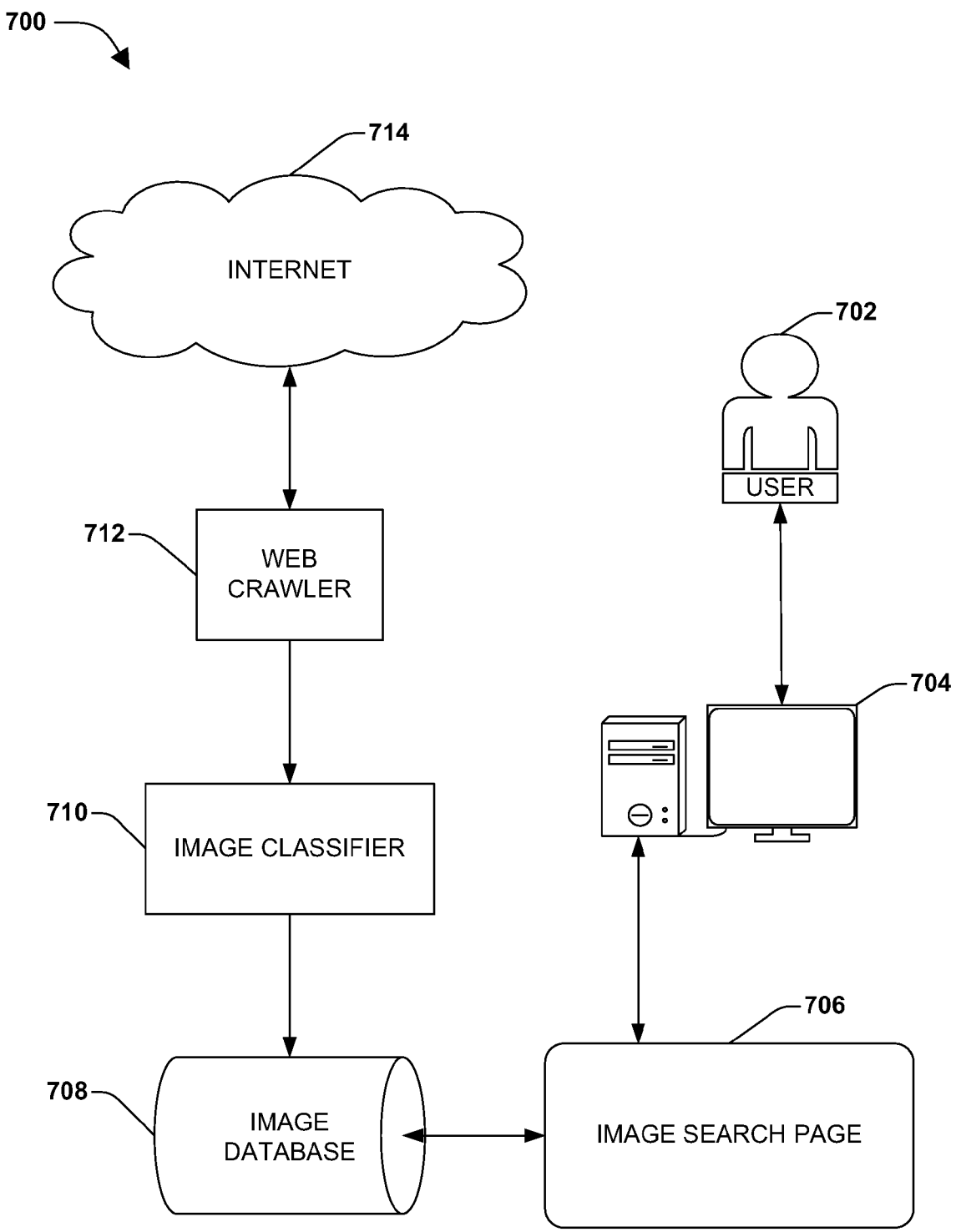
FIG. 7 is an illustration of an exemplary embodiment of a method and system for retrieving images that have been classified.

In one embodiment of the techniques and systems described herein, a user may search for images using an image search website. As an example, the user may enter image search terms into an image search page and a filter parameter for either "graphics" or "photos." In this example, the image search website applies the filter parameter to images returned from an image database, relating to the search terms, to display only those images that meet the filter criteria (e.g., "graphics" returns graphical or synthetically produced images having the search terms). FIG. 7 illustrates an example 700 of this embodiment. A user 702 enters search terms and filter criteria (e.g., "german shepherd dog filter: photos") into an image search page 706 using a computer system 704. The image search page 706 sends the search terms and filter criteria to an image database 708, which returns images that meet both the search terms and filter criteria entered by the user 702. However, in order to retrieve images that meet the filter criteria, for example, metadata can be added to an image that indicates the image is either a "graphic" or a "photo" (e.g., natural photograph). In this example, in order to add respective metadata that corresponds to an image's classification, a web-crawler 712 retrieves images from the Internet 714 and sends the images to an image classifier 710. The image classifier 710 determines whether the respective images are either "photos" or "graphics" and attaches respective corresponding metadata, before sending the images to the image database 708.

Figure 12:
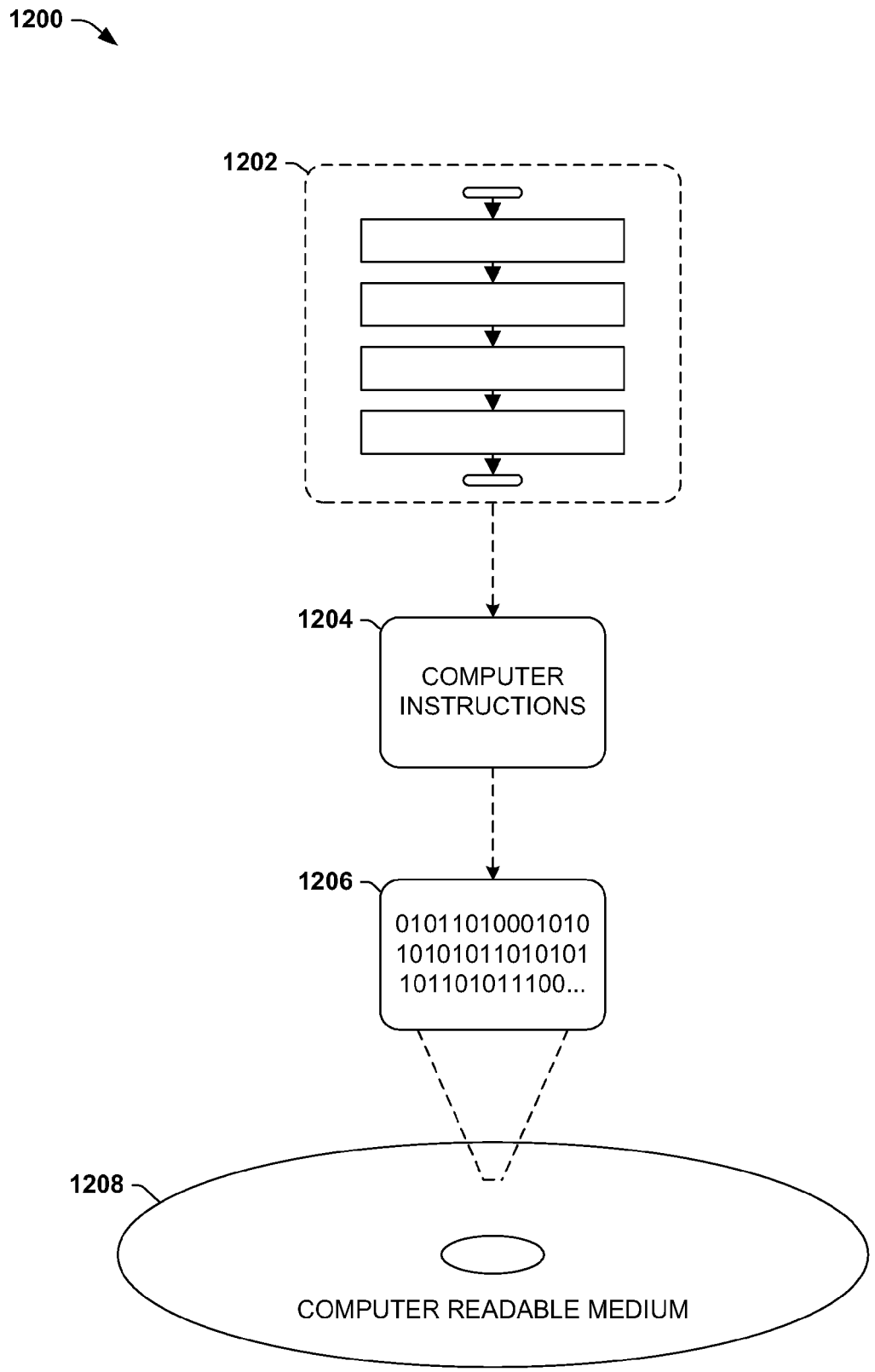
FIG. 12 is an illustration of an exemplary computer-readable medium comprising processor-executable instructions configured to embody one or more of the techniques provided herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 12, wherein the implementation 1200 comprises a computer-readable medium 1208 (e.g., a CD-R, DVD-R, or a platter of a hard disk drive), on which is encoded computer-readable data 1206. This computer-readable data 1206 in turn comprises a set of computer instructions 1204 configured to operate according to the principles set forth herein. In one such embodiment, the processor-executable instructions 1204 may be configured to perform a method 1202 for classifying photo and graphic images using features generated from image statistics, such as the exemplary method 100 of FIG. 1, for example. Many such computer-readable media may be devised by those of ordinary skill in the art that are configured to operate in accordance with the techniques presented herein.

Figure 13:
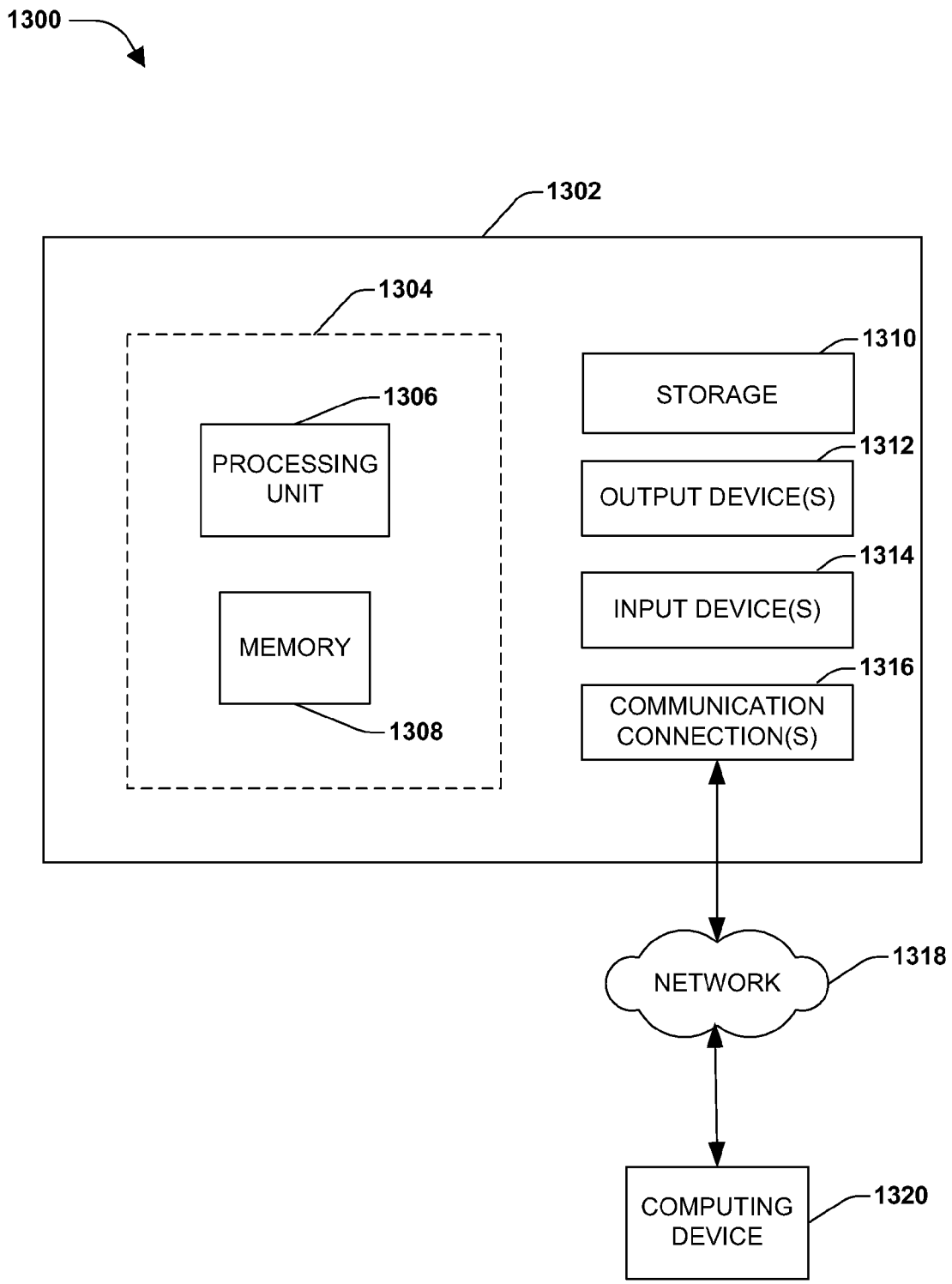
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 1310 comprising a computing device 1312 configured to implement one or more embodiments provided herein. In one configuration, computing device 1312 includes at least one processing unit 1316 and memory 1318. Depending on the exact configuration and type of computing device, memory 1318 may be volatile (such as RAM, for example), non-volatile (such as ROM, flash memory, etc., for example) or some combination of the two. This configuration is illustrated in FIG. 13 by dashed line 1314.

In other embodiments, device 1312 may include additional features and/or functionality. For example, device 1312 may also include additional storage (e.g., removable and/or non-removable) including, but not limited to, magnetic storage, optical storage, and the like. Such additional storage is illustrated in FIG. 13 by storage 1320. In one embodiment, computer readable instructions to implement one or more embodiments provided herein may be in storage 1320. Storage 1320 may also store other computer readable instructions to implement an operating system, an application program, and the like. Computer readable instructions may be loaded in memory 1318 for execution by processing unit 1316, for example.

The term "computer readable media" as used herein includes computer storage media. Computer storage media includes volatile and nonvolatile, removable and non-removable media implemented in any method or technology for storage of information such as computer readable instructions or other data. Memory 1318 and storage 1320 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1312. Any such computer storage media may be part of device 1312.

Device 1312 may also include communication connection(s) 1326 that allows device 1312 to communicate with other devices. Communication connection(s) 1326 may include, but is not limited to, a modem, a Network Interface Card (NIC), an integrated network interface, a radio frequency transmitter/receiver, an infrared port, a USB connection, or other interfaces for connecting computing device 1312 to other computing devices. Communication connection(s) 1326 may include a wired connection or a wireless connection. Communication connection(s) 1326 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1312 may include input device(s) 1324 such as keyboard, mouse, pen, voice input device, touch input device, infrared cameras, video input devices, and/or any other input device. Output device(s) 1322 such as one or more displays, speakers, printers, and/or any other output device may also be included in device 1312. Input device(s) 1324 and output device(s) 1322 may be connected to device 1312 via a wired connection, wireless connection, or any combination thereof. In one embodiment, an input device or an output device from another computing device may be used as input device(s) 1324 or output device(s) 1322 for computing device 1312.

Components of computing device 1312 may be connected by various interconnects, such as a bus. Such interconnects may include a Peripheral Component Interconnect (PCI), such as PCI Express, a Universal Serial Bus (USB), firewire (IEEE 8394), an optical bus structure, and the like. In another embodiment, components of computing device 1312 may be interconnected by a network. For example, memory 1318 may be comprised of multiple physical memory units located in different physical locations interconnected by a network.

Those skilled in the art will realize that storage devices utilized to store computer readable instructions may be distributed across a network. For example, a computing device 1330 accessible via network 1328 may store computer readable instructions to implement one or more embodiments provided herein. Computing device 1312 may access computing device 1330 and download a part or all of the computer readable instructions for execution. Alternatively, computing device 1312 may download pieces of the computer readable instructions, as needed, or some instructions may be executed at computing device 1312 and some at computing device 1330.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for classifying an image as either a photo or a graphics image using a boosting decision tree, comprising:
    using a gradient magnitude-orientation histogram and respective multidimensional independent histograms for red, green, and blue color bands to determine one or more classifying features of an image; and
    classifying the image as either a photo or a graphics image using a boosting decision tree trained using the one or more classifying features.

2. The method of claim 1, the using a gradient magnitude-orientation histogram comprising:
    measuring a difference between a first energy value of a lower frequency color band and a second energy value of a higher frequency color band using the gradient magnitude-orientation histogram to determine a classifying feature.

3. The method of claim 1, the using respective multidimensional independent histograms for red, green, and blue color bands comprising:
    determining a classifying feature corresponding to at least one of:
        a statistical mean value;
        a statistic variance value;
        a statistical skewness value; and
        a statistical kurtosis value.

4. The method of claim 1, the using a gradient magnitude-orientation histogram comprising:
    determining an entropy value associated with the gradient magnitude-orientation histogram to determine a classifying feature.

5. The method of claim 1, the gradient magnitude-orientation histogram comprising a 40×8=320 gradient magnitude-orientation histogram.

6. The method of claim 1, respective multidimensional independent histograms for red, green, and blue color bands comprising independent histograms of one hundred dimensions for respective red, green, and blue color bands.

7. The method of claim 1, the using respective multidimensional independent histograms for red, green, and blue color bands comprising:
    determining a statistical discreteness value as a classifying feature based upon the respective multidimensional independent histograms for red, green, and blue color bands.

8. The method of claim 1, comprising:
    using an edge detector to determine one or more classifying features of the image.

9. The method of claim 8, the edge detector comprising a canny edge detector.

10. The method of claim 8, the using an edge detector comprising:
    determining a total number of edges in the image to determine a classifying feature.

11. The method of claim 8, the using an edge detector comprising:
    determining an average length of edges in the image to determine a classifying feature.

12. A computer-readable medium comprising processor-executable instructions that when executed perform a method for classifying an image as either a photo or a graphics image using a boosting decision tree, comprising:
    using a multidimensional local binary pattern texture histogram and respective multidimensional independent histograms for red, green, and blue color bands to determine one or more classifying features of an image; and
    classifying the image as either a photo or a graphics image using a boosting decision tree trained using the one or more classifying features.

13. The computer-readable medium of claim 12, the using a multidimensional local binary pattern texture histogram comprising:
    determining an entropy value associated with the multidimensional local binary pattern texture histogram to determine a classifying feature.

14. The computer-readable medium of claim 12, the multidimensional local binary pattern texture histogram comprising a fifty-nine dimensional texture histogram.

15. The computer-readable medium of claim 14, the fifty-nine dimensional texture histogram comprising fifty-eight bins associated with uniform local binary patterns and one bin associated with non-uniform local binary patterns.

16. A system for classifying an image as either a photo or a graphics image using a boosting decision tree, comprising:
    a gray level pixel spatial correlogram component configured to generate a spatial correlogram of gray level pixels of an image;
    a color histogram component configured to generate respective multidimensional independent histograms for red, green, and blue color bands of the image;
    an image classifying feature component configured to determine one or more classifying features of the image using the spatial correlogram of gray level pixels and the respective multidimensional independent histograms for red, green, and blue color bands; and
    a boosting decision tree component configured to classify the image as either a photo or a graphics image using a boosting decision tree trained using the one or more classifying features.

17. The system of claim 16, comprising:
    a joint red-green-blue histogram component configured to generate a joint multidimensional red-green-blue histogram of the image.

18. The system of claim 17, the image classifying feature component configured to determine one or more classifying features using the joint multidimensional red-green-blue histogram.

19. The system of claim 16, the image classifying feature component configured to determine an average skewness for respective slices of the spatial correlogram of gray level pixels to determine one or more classifying features.

20. The system of claim 16, the image classifying feature component configured to determine an average variance ratio comprising a ratio of variance for respective slices of the spatial correlogram of gray level pixels to determine one or more classifying features.

* * * * *